Patented May 22, 1928.

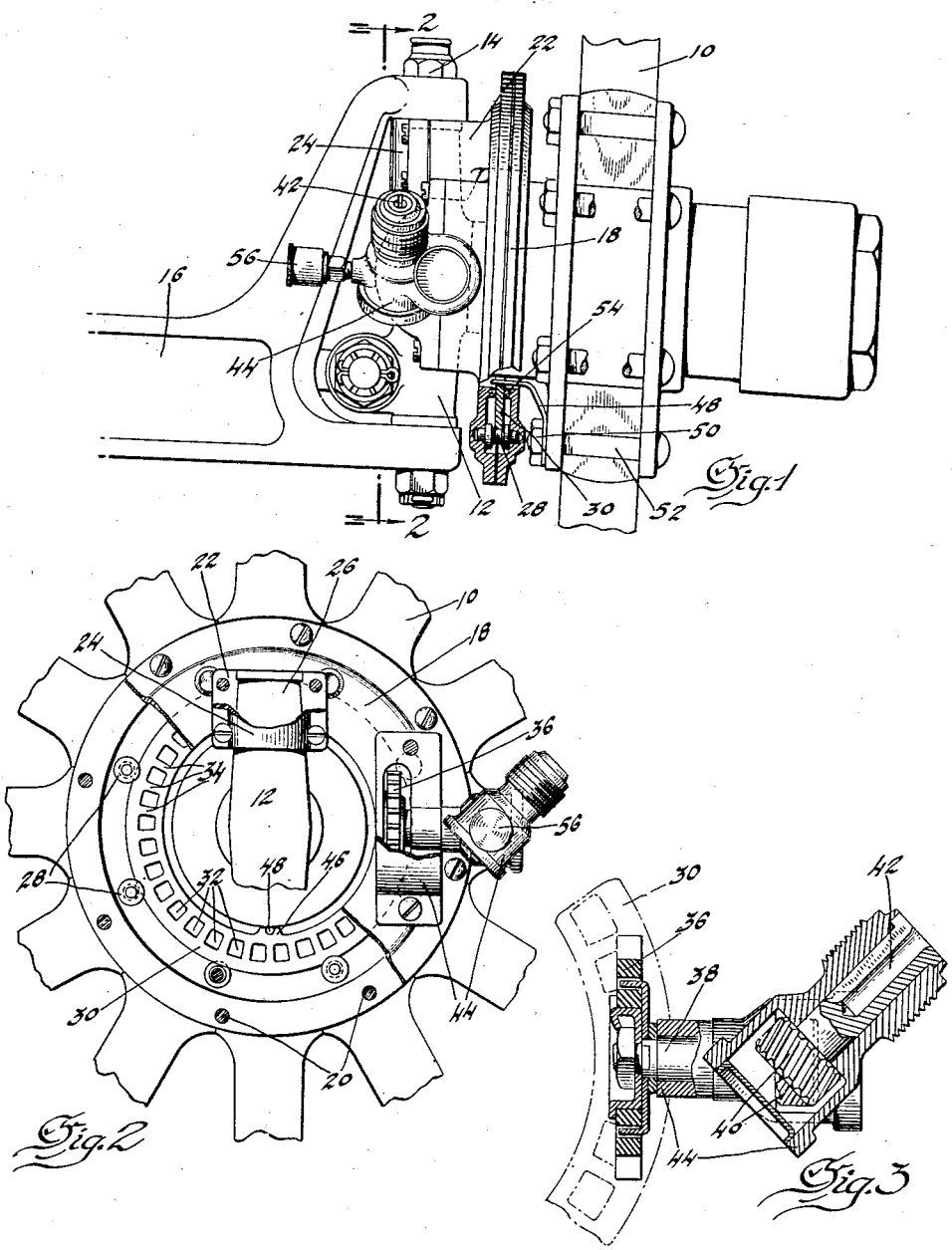

1,670,841

UNITED STATES PATENT OFFICE.

ALBERT CHAMPION, OF FLINT, MICHIGAN, ASSIGNOR, BY MESNE ASSIGNMENTS, TO A C SPARK PLUG CO., OF FLINT, MICHIGAN.

DRIVE UNIT.

Application filed May 31, 1924. Serial No. 717,065.

This invention relates to speedometers and similar instruments, and is illustrated as embodied in a drive unit adapted for mounting on a front wheel knuckle for driving connection with the front wheel, and arranged to operate instrument driving connections.

An object of the invention is to provide driving connections which can be shipped and otherwise handled as a unit, instead of having to be assembled at the time they are placed on the car, thus facilitating sale and distribution as an automobile accessory. Preferably the parts are inclosed in a housing, which not only protects them against mud and dust but also prevents the car owner from tampering with the adjustments. In one very desirable arrangement, a novel ring gear in an annular housing is geared to instrument-driving connections, and is driven by a connection from the wheel.

Another feature of the invention relates to the ring gear and its connections, which are especially adapted for (although not limited to) use with such a unit, the gear having substantially unbroken inner and outer edges and being provided with angularly-spaced openings forming teeth which mesh with an instrument-driving gear. The gear may be supported by anti-friction members engaging one of said edges, and driven by a connection at the other edge, shown by way of example as a member connected to the wheel and engaging a projection on said other edge of the gear.

The above and other objects and features of the invention, including various novel combinations of parts and desirable particular constructions, will be apparent from the following description of one illustrative embodiment shown in the accompanying drawings, in which:

Figure 1 is a rear elevation, partly broken away, of the drive unit and associated parts of the front axle assembly of an automobile;

Figure 2 is a section on the line 2—2 of Figure 1, but partly broken away, showing the unit in side elevation; and Figure 3 is a section through the instrument-driving gear connections.

In the form selected for illustration, the unit is intended for driving connection with a front wheel 10 journaled on the spindle of a knuckle 12 arranged for swiveling steering movement about a king pin 14 carried by the arms of a bifurcated front axle 16.

The unit itself is shown as comprising an annular housing 18, which may be in two parts secured together by screws or bolts 20, and which is formed with a semi-cylindrical bearing part 22 cooperating with a complementary bearing cap 24 to clamp the housing to a part 26 of the knuckle 12. The annular housing 18 is thus rigidly supported in a position where it surrounds the spindle on which the wheel is journaled.

The housing is provided with anti-friction rolls 28, or equivalent anti-friction members, engaging the unbroken outer edge of a novel ring gear 30 which has a series of angularly-spaced openings 32 forming driving teeth or webs 34. The teeth 34 mesh with a pinion or gear 36 on a short shaft 38 driving through spiral gears 40 a connection 42 for the usual flexible drive shaft running to the speedometer or other instrument (not shown). Parts 36—42 are preferably carried by a separable part 44 of the housing, and pinion 36 meshes with teeth 34 through an opening in the side of the housing which is closed by the separable part 44.

Ring gear 30, as shown in Figures 1 and 2, has a substantially unbroken inner edge which is, however, provided with a driving connection from the wheel. This connection is preferably simply a projection or equivalent member 46 on the gear engaged by a driving member or finger 48 secured to the wheel, for example by the nut 50 of one of the bolts 52 of the wheel. If desired, packings 54 (Figure 1) may be provided in the edges of the annular housing 18 in sealing engagement with the sides of the gear 30, to retain oil. Oil or other lubricant is supplied through a suitable fitting 56.

While one illustrative embodiment of the invention has been described in detail, it is not the intention to limit its scope to that particular embodiment, or otherwise than by the terms of the appended claims.

I claim:

1. A front wheel instrument drive unit comprising, in combination, an annular housing, a ring gear in the housing, anti-friction rolls carried by the housing and supporting the periphery of the gear, a bracket carrying the housing and constructed and arranged to be secured to a front wheel knuckle, a gear connection from the ring gear, and a driving connection arranged to be operated by a front wheel and which engages the ring gear.

2. An instrument drive unit comprising, in combination, a ring gear, an annular housing arranged to be rigidly supported and having an annular space U-shaped in cross-section to receive the ring gear with the edges of the housing in close proximity to the side faces of the ring gear, and a driving lug projecting from the ring gear radially inward, a wheel carried part brought into driving engagement with said lug by a movement of the housing into operative position.

3. An instrument drive unit comprising, in combination, a ring gear, an annular housing arranged to be rigidly supported and having an annular space U-shaped in cross-section to receive the ring gear with the edges of the housing in close proximity to the side faces of the ring gear, a series of anti-friction members carried by the housing and spaced about the external periphery of the gear, and a drive member projecting from the inner edge of the gear between said edges of the housing.

4. A drive unit comprising, in combination, a flat ring gear having substantially unbroken inner and outer edges and provided with angularly spaced openings forming teeth, a driven gear meshing with said teeth, anti-friction members supporting the gear by engagement with its outer edge, and a drive connection including a projection on the inner edge and a member engaging the projection.

In testimony whereof I affix my signature.

ALBERT CHAMPION.